Figures 1, 2, 3:
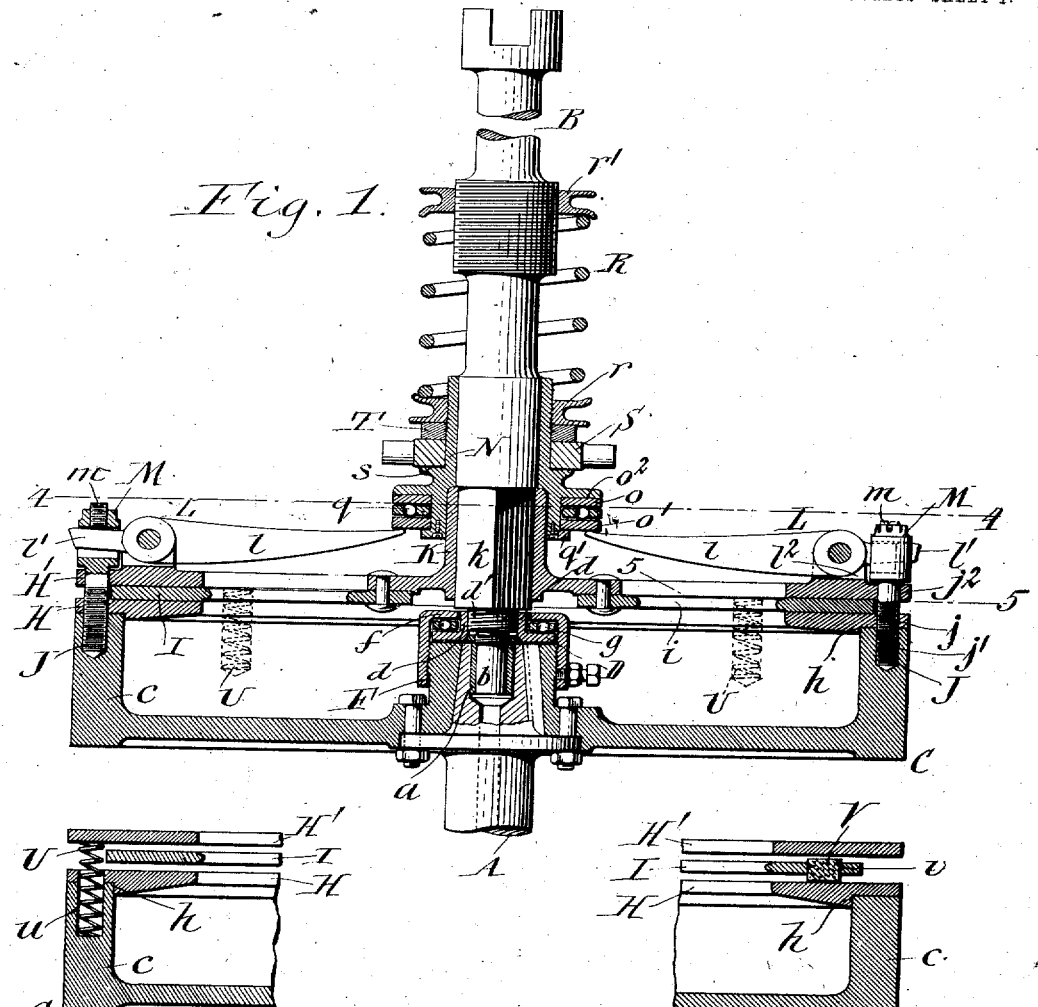

No. 863,064. PATENTED AUG. 13, 1907.
H. J. HASS, F. P. NEHRBAS & J. R. SHORT.
FRICTION CLUTCH.
APPLICATION FILED FEB. 21, 1906.

2 SHEETS—SHEET 1.

Witnesses:

Herman J. Hass,
James R. Short,
Frederick P. Nehrbas,
Inventors
by Geyer & Popp
Attorneys No. 863,064.  
PATENTED AUG. 13, 1907.  
H. J. HASS, F. P. NEHRBAS & J. R. SHORT.  
FRICTION CLUTCH.  
APPLICATION FILED FEB. 21, 1906.
2 SHEETS—SHEET 2.
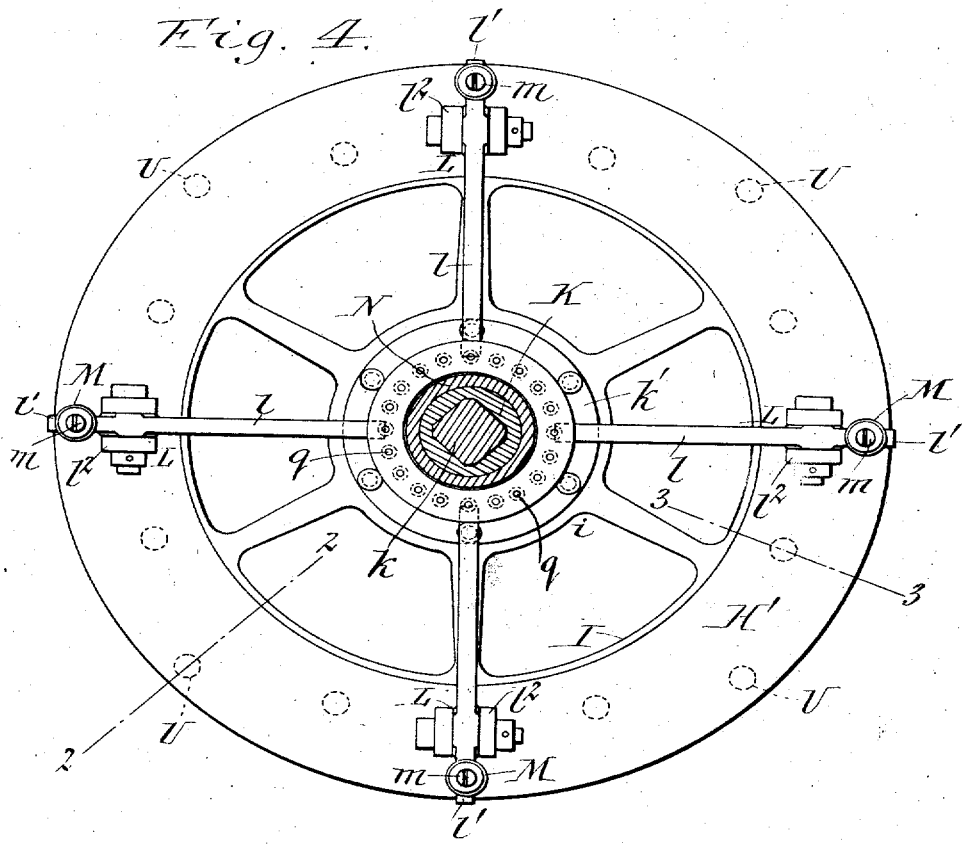
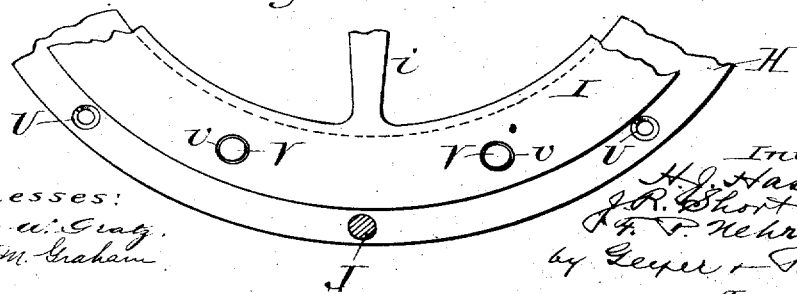

UNITED STATES PATENT OFFICE.

HERMAN J. HASS, FREDERICK P. NEHRBAS, AND JAMES R. SHORT, OF BUFFALO, NEW YORK, ASSIGNORS TO E. R. THOMAS COMPANY, OF BUFFALO, NEW YORK.

FRICTION-CLUTCH.

No. 863,064.     Specification of Letters Patent.     Patented Aug. 13, 1907.

Application filed February 21, 1906. Serial No. 302,159.

*To all whom it may concern:*

Be it known that we, HERMAN J. HASS, FREDERICK P. NEHRBAS, and JAMES R. SHORT, citizens of the United States, residing at Buffalo, in the county of Erie and State of New York, have invented a new and useful Improvement in Friction-Clutches, of which the following is a specification.

This invention relates to a friction clutch which is more particularly designed for use in coupling or uncoupling the driving and driven shafts of an automobile but the same may also be used for other purposes.

The object of this invention is to produce a clutch for this purpose which is comparatively simple in construction, reliable in operation and easily manipulated.

In the accompanying drawings consisting of 2 sheets: Figure 1 is a central longitudinal section of our improved clutch showing the parts in position for coupling the driving and driven members. Figs. 2 and 3 are fragmentary views in lines 2—2 and 3—3, Fig. 4, respectively, showing the parts in the position which they occupy when the driving and driven members are uncoupled. Fig. 4 is a cross section in line 4—4, Fig. 1. Fig. 5 is a fragmentary cross section in line 5—5, Fig. 1.

Similar letters of reference indicate corresponding parts throughout the several views.

A represents the driving shaft or member and B the driven shaft or member of an automobile driving mechanism, which shafts are arranged axially in line. The driving shaft is provided at its rear end with a fly wheel or circular head C which forms part of the clutch whereby the driving and driven shafts are coupled or uncoupled. The opposing ends of said shafts are preferably held in alinement with each other by inserting the reduced front end $b$ of the driven shaft in a central socket $a$ formed in the rear end of the driving shaft, as shown in Fig. 1. These shafts are also held against axial movement relatively to each other by an internally screw threaded collar $d$ which engages with a threaded portion $d^1$ on the driven shaft and provided with an external front bearing flange D which is arranged adjacent to the rear end of the driving shaft, an internally threaded sleeve F secured to the rear end of the hub of the fly wheel and provided at its rear end with an internal rear bearing flange $f$, and an annular row of balls $g$ interposed between said bearing flanges.

H, $H^1$ represent two opposing driving clutch members or rings and I a driven clutch member or ring which is interposed between the driving clutch rings. The front driving clutch ring is engaged with the rear end of the rim $c$ of the fly wheel and provided with an external annular shoulder $h$ which fits against the bore of the fly wheel rim whereby these parts are centered upon each other. The rear driving clutch ring $H^1$ is movable toward and from the front driving ring H for gripping or releasing the driven ring between the same and is guided during these movements by longitudinal guide pins, studs or rods J secured at their threaded front ends in openings $j$, $j^1$ in the periphery of the front clutch ring and wheel rim, while their rear smooth portions pass loosely through openings $j^2$ in the periphery or marginal part of the rear clutch ring, as shown in Fig. 1. The driven clutch ring is mounted on the driven shaft so as to be compelled to turn therewith but free to move axially thereon to a limited extent preferably by means of a hub K having a flat sided bore which fits over a flat sided part $k$ on the driven shaft, an external flange $k^1$ arranged on the hub K, and an internal spider $i$ formed on the driven clutch ring and connected with the flange $k^1$. Upon drawing the driving rings H, $H^1$ together, the driven ring is gripped between the same, causing the driving and driven shafts to be coupled while upon separating or releasing the driving rings from the driven ring these shafts will be uncoupled.

The mechanism shown in the drawings whereby the driving rings are tightened upon or released from the driven ring is constructed as follows: L represents a plurality of clamping levers arranged radially and equidistant adjacent to the rear side of the rear clutch ring and each pivoted between its outer and inner arms $l$, $l^1$ on lugs $l^2$ on the rear clutch ring, so that the same turns in a plane lengthwise of the axis of the clutch. The outer arm of each clamping lever enters an eye M at the rear end of one of the guide rods and bears with its rear side against a longitudinal adjusting screw $m$ arranged in the rear end of said eye. Upon moving the inner arms of the several clamping levers forward simultaneously the outer arms turn on the screws $m$ as fulcrums and cause the rear clutch ring to which the clamping levers are pivoted between their ends to be moved forward, thereby drawing the front and rear clutch rings together and gripping the intermediate driven clutch ring between them, whereby the driving and driven shafts are coupled. Upon permitting the inner arms of the clamping levers to move rearwardly, the pressure of the driving clutch rings against opposite sides of the driven disk is removed and the driving and driven shafts are uncoupled.

N represents a shifting sleeve which is movable lengthwise on the driven shaft in rear of the hub K and operates upon the inner arms of the clamping levers by means of an interposed ball bearing for reducing the friction between these parts. The ball bearing consists essentially of two bearing rings $o$, $o^1$ surrounding the front part of the shifting sleeve and engaging respectively with a rear shoulder or abutment $o^2$ on said sleeve and the inner ends of the clamping levers, an annular row of balls $q$ interposed between the bearing rings and a locking washer $q^1$ secured to the front end of the shifting sleeve and engaging with the front bearing ring. When free the shifting sleeve is moved forwardly by a spring R surrounding the driven shaft and bearing at its front end against a screw nut $r$ on the rear end of the shifting sleeve while its rear end bears against a screw nut $r^1$ arranged on the driven shaft, thereby causing the clamping levers to be operated for closing the clutch. The shifting sleeve is moved in the opposite direction for opening the clutch by means of a shifting collar S which is connected in any suitable manner with hand-operated means and a brake collar T of fiber or similar material. Both of these collars surround the shifting sleeve, the former bearing with its front side against a rigid rearwardly facing shoulder $s$ on the sleeve and the latter being arranged between the shifting collar S and the front spring supporting nut $r$. Upon moving the shifting collar rearwardly for uncoupling the clutch the same engages frictionally with the fiber collar T producing a braking effect which serves to promptly arrest the rotation of the driven shaft when the same has been uncoupled from the driving shaft.

For the purpose of causing the driving clutch rings to be separated quickly from the driven clutch ring when the clutch is opened or released and thereby reduce the wear upon the parts to a minimum, a plurality of separating springs U are employed which are arranged in an annular row and each of which is arranged at its front end in a socket $u$ formed in the marginal part of the fly wheel and front clutch ring and bears with its rear end against the front side of the rear clutch ring. The instant the clamping levers are released, the springs U move the rear clutch ring rearwardly, as shown in Fig. 2, and thus relieve the driven clutch ring from the wearing action of the driving clutch while the latter continue their rotation independent of the driven clutch ring.

In order to prevent noise when the front and rear clutch rings are operatively engaged with opposite sides of the intermediate clutch ring, a plurality of cushions or buffers V of felt or similar material are employed. These buffers are constructed in the form of cylindrical plugs which are arranged in an annular row of openings $v$ in the intermediate clutch ring.
The felt buffers are preferably of such length that when the front and rear clutch rings are released from the intermediate ring the ends of the buffers project slightly beyond opposite sides of the intermediate ring, as shown in Fig. 3. Upon subsequently closing the clutch the front and rear clutch rings first engage the projecting ends of the buffers and then compress the same until these rings bear firmly against the intermediate ring, thereby causing the clutch to be closed or coupled without undue noise and rendering the same particularly desirable for use in automobiles. The buffers are preferably soaked in oil, so as to lubricate the cooperating surfaces of the clutch rings and prevent the same from wearing rapidly.

We claim as our invention:

1. A friction clutch comprising a driving shaft, a driven shaft, means for rotatably coupling or uncoupling said shafts, consisting of a fly wheel secured to the driving shaft, a driven ring connected with the driven shaft, and two driving rings connected with the fly wheel and adapted to be engaged with or disengaged from opposite sides of the driven ring, and means for holding said shafts against axial movement relatively to each other consisting of a sleeve secured to the driven shaft and provided at its front end with an external bearing flange, a sleeve secured to the hub of the fly wheel and provided with an internal bearing flange, and a row of balls interposed between said bearing flanges, substantially as set forth.

2. A friction clutch comprising a driving shaft, a driven shaft, a fly wheel secured to the driving shaft, a front clutch ring bearing against the rim of said wheel and having an outwardly facing shoulder which engages with the bore of said rim, guide rods secured at their front ends in openings formed in the marginal part of said front ring and the rim of said wheel, a rear clutch ring movably mounted on the rear part of said guide rods, an intermediate ring connected with the driven shaft and interposed between said front and rear rings, and means operating to press said front and rear rings against opposite sides of the intermediate ring, substantially as set forth.

3. A friction clutch comprising a driving shaft, a driven shaft, a fly wheel secured to the driving shaft, a front clutch ring bearing against the rim of said wheel and having an outwardly facing shoulder which engages with the bore of said rim, guide rods secured at their front ends in openings formed in the marginal part of said front ring and the rim of said wheel, a rear clutch ring movably mounted on the rear part of said guide rods, an intermediate ring connected with the driven shaft and interposed between said front and rear rings, and means operating to press said front and rear rings against opposite sides of the intermediate ring, comprising an eye arranged on the rear end of each guide rod, clamping levers pivoted on the rear clutch disk and each arranged with its outer arm in one of said eyes, adjusting screws arranged in the rear ends of said eyes and engaging the rear side of said outer arms, and a shifting device operatively engaging the inner ends of said levers, substantially as set forth.

4. A friction clutch comprising a driving shaft, a driven shaft, a fly wheel arranged on the driving shaft, two driving rings connected with the fly wheel, an intermediate driven ring arranged between the driving rings, means for engaging said driving rings with opposite sides of the intermediate ring, and a hub connected with said driven ring and having a flat sided bore which fits slidingly on a correspondingly-shaped part of the driven shaft for compelling the driven ring and driven shaft to turn together but permitting the driven ring to move axially independent of the driven shaft, substantially as set forth.

5. A friction clutch comprising a driving shaft, a driven shaft, a fly wheel arranged on the driving shaft, two driving rings connected with the fly wheel, an intermediate driven ring arranged between the driving rings, means for engaging said driving rings with opposite sides of the intermediate ring, comprising clamping levers pivoted on one driving ring and having their outer arms operatively connected with the fly wheel, a shifting sleeve movable lengthwise on the driven shaft, front and rear bearing rings surrounding said sleeve and engaging, respectively, with the inner arms of the clamping levers and a shoulder on said sleeve, a row of balls interposed between said bearing rings, and a locking washer secured to said sleeve and engaging with the front side of the front bearing ring, substantially as set forth.

6. A friction clutch comprising a driving shaft, a driven shaft, a fly wheel arranged on the driving shaft, two driving rings connected with the fly wheel, an intermediate driven ring arranged between the driving rings, means for engaging said driving rings with opposite sides of the intermediate ring, comprising clamping levers pivoted on one driving ring and having their outer arms operatively connected with the fly wheel, a shifting sleeve movable lengthwise on the driven shaft, a brake collar arranged on the shifting sleeve, and a shifting collar arranged on said sleeve between said brake collar and a shoulder on said sleeve, substantially as set forth.

7. A friction clutch comprising a driving shaft, a driven shaft, a fly wheel arranged on the driving shaft, two driving rings connected with the fly wheel, an intermediate driven ring arranged between the driving rings, means for engaging said driving rings with opposite sides of the intermediate ring comprising clamping levers pivoted on one driving ring and having their outer arms operatively connected with the fly wheel, a shifting sleeve movable lengthwise on the driven shaft, a brake collar arranged on said sleeve, a shifting collar arranged on said sleeve between the front side of the brake collar and a rearwardly facing shoulder on the sleeve, screw-nuts arranged on the sleeve in rear of the brake collar, and on the rear part of the driven shaft, respectively, and a spring surrounding the driven shaft between said screw nuts, substantially as set forth.

8. A friction clutch comprising a rotary intermediate clutch member having openings extending entirely through the same, two rotary outer clutch members adapted to grip opposite sides of the intermediate member or release the same, and endwise compressible and expansible fibrous plugs arranged in said openings and normally projecting with opposite ends beyond the sides of the intermediate clutch member when the outer clutch members are released from the intermediate clutch member and to be compressed flush with the opposite faces of the intermediate clutch member when the latter is engaged by the outer clutch members, substantially as set forth.

Witness our hands this 30th day of January, 1906.

HERMAN J. HASS.
FREDERICK P. NEHRBAS.
JAMES R. SHORT.

Witnesses:
CECILIA M. WEHRFRITZ,
THEO. L. POPP.

Correction in Letters Patent No. 863,064.

It is hereby certified that the name of the assignee in Letters Patent No. 863,064, granted August 13, 1907, upon the application of Herman J. Hass, Frederick P. Nehrbas, and James R. Short, of Buffalo, New York, for an improvement in "Friction-Clutches," was erroneously written and printed "E. R. Thomas Company," whereas said name should have been written and printed *E. R. Thomas Motor Company;* and that the said Letters Patent should be read with this correction therein that the same may conform to the record of the case in the Patent Office.

Signed and sealed this 17th day of September, A. D., 1907.

[SEAL.]

E. B. MOORE,
*Commissioner of Patents.* driving ring and having their outer arms operatively connected with the fly wheel, a shifting sleeve movable lengthwise on the driven shaft, a brake collar arranged on said sleeve, a shifting collar arranged on said sleeve between the front side of the brake collar and a rearwardly facing shoulder on the sleeve, screw-nuts arranged on the sleeve in rear of the brake collar, and on the rear part of the driven shaft, respectively, and a spring surrounding the driven shaft between said screw nuts, substantially as set forth.

8. A friction clutch comprising a rotary intermediate clutch member having openings extending entirely through the same, two rotary outer clutch members adapted to grip opposite sides of the intermediate member or release the same, and endwise compressible and expansible fibrous plugs arranged in said openings and normally projecting with opposite ends beyond the sides of the intermediate clutch member when the outer clutch members are released from the intermediate clutch member and to be compressed flush with the opposite faces of the intermediate clutch member when the latter is engaged by the outer clutch members, substantially as set forth.

Witness our hands this 30th day of January, 1906.

HERMAN J. HASS.
FREDERICK P. NEHRBAS.
JAMES R. SHORT.

Witnesses:
CECILIA M. WEHRFRITZ,
THEO. L. POPP.

Correction in Letters Patent No. 863,064.

It is hereby certified that the name of the assignee in Letters Patent No. 863,064, granted August 13, 1907, upon the application of Herman J. Hass, Frederick P. Nehrbas, and James R. Short, of Buffalo, New York, for an improvement in "Friction-Clutches," was erroneously written and printed "E. R. Thomas Company," whereas said name should have been written and printed *E. R. Thomas Motor Company;* and that the said Letters Patent should be read with this correction therein that the same may conform to the record of the case in the Patent Office.

Signed and sealed this 17th day of September, A. D., 1907.

[SEAL.]

E. B. MOORE,
*Commissioner of Patents.*

It is hereby certified that the name of the assignee in Letters Patent No. 863,064, granted August 13, 1907, upon the application of Herman J. Hass, Frederick P. Nehrbas, and James R. Short, of Buffalo, New York, for an improvement in "Friction-Clutches," was erroneously written and printed "E. R. Thomas Company," whereas said name should have been written and printed *E. R. Thomas Motor Company;* and that the said Letters Patent should be read with this correction therein that the same may conform to the record of the case in the Patent Office.

Signed and sealed this 17th day of September, A. D., 1907.

[SEAL.]
                                                                       E. B. MOORE,
*Commissioner of Patents.*